US011138892B2

United States Patent
Nicholls et al.

(10) Patent No.: US 11,138,892 B2
(45) Date of Patent: Oct. 5, 2021

(54) TCAS COUPLED FMS

(71) Applicant: HONEYWELL INTERNATIONAL INC., Morris Plains, NJ (US)

(72) Inventors: James Alexander Nicholls, Glendale, AZ (US); Michael Duane Mead, Surprise, AZ (US); Erik Ringnes, Glendale, AZ (US); Ratan Khatwa, Sammamish, WA (US); Michael McSharry, North Bend, WA (US); Jon Bartling, Peoria, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 341 days.

(21) Appl. No.: 15/847,147

(22) Filed: Dec. 19, 2017

(65) Prior Publication Data

US 2019/0189017 A1 Jun. 20, 2019

(51) Int. Cl.
*G08G 5/00* (2006.01)
*G08G 5/04* (2006.01)
*G05D 1/00* (2006.01)

(52) U.S. Cl.
CPC .......... *G08G 5/045* (2013.01); *G05D 1/0061* (2013.01); *G08G 5/0008* (2013.01); *G08G 5/0039* (2013.01)

(58) Field of Classification Search
CPC .... G08G 5/045; G08G 5/0008; G08G 5/0039; G05D 1/0061

(Continued)

(56) References Cited

U.S. PATENT DOCUMENTS 8,296,054 B2 10/2012 Botargues et al.
8,380,424 B2 * 2/2013 Bushnell ............. G01C 23/005
340/961

(Continued)

FOREIGN PATENT DOCUMENTS

EP 3076379 A1 10/2016
WO 2006040441 4/2006

OTHER PUBLICATIONS

Lantema, F.; Automatic Emergency Descent; Aviation Electronics Europe, Mar. 25-26, 2015.

(Continued)

*Primary Examiner* — Thomas E Worden
*Assistant Examiner* — Tiffany P Ohman
(74) *Attorney, Agent, or Firm* — Lorenz & Kopf, LLP (57) ABSTRACT

An enhanced flight control system and method providing a technological improvement over a conventional flight control systems. A control module employs rules to determine whether or not a received traffic collision avoidance system (TCAS) evasive maneuver is automatically implemented. Specifically, the control module effectively couples the TCAS to the FMS, allowing access to the flight plan and to the navigation database and the approach procedures and runway data therein. An algorithm determines when there is a co-occurrence of the conditions (1) a flight plan uploaded in the FMS, (2) autopilot is engaged, (3) VNAV is engaged. Upon co-occurrence of (1) and (2) and (3), and an evasive maneuver is received from a TCAS, the control module determines whether or not to automatically implement the evasive maneuver. Look ahead algorithms may also analyse and modify the flight plan to preclude TCAS alerts and evasive procedures being required.

12 Claims, 2 Drawing Sheets

(58) Field of Classification Search
USPC .......................................................... 701/16
See application file for complete search history.

(56) References Cited

U.S. PATENT DOCUMENTS

| | | | |
|---|---|---|---|
| 8,521,340 B2* | 8/2013 | Coulmeau | G08G 5/0056 |
| | | | 340/945 |
| 9,633,567 B1 | 4/2017 | Skoog et al. | |
| 10,114,381 B2* | 10/2018 | Haskins | G08G 5/0013 |
| 2007/0129855 A1 | 6/2007 | Coulmeau | |
| 2008/0021647 A1 | 1/2008 | Daveze et al. | |
| 2011/0288773 A1 | 11/2011 | Hoy | |
| 2016/0342159 A1 | 11/2016 | Lanterna et al. | |

OTHER PUBLICATIONS

Airbus: "EASA certifies new "Autopilot/Flight Director" TCAS mode for A380", Aug. 20, 2009, Retrieved from the Internet: URL: https://www.airbus.com/newsroom/press-releases/en/2009/08/easa-certifies-new-autopilot-flight-director-tcas-mode-for-a380.html [retrieved on May 8, 2019].

Eurocontrol: "Overview of ACAS II—Jul. 2014 Eurocontrol 1 The European Organisation for the Safety of Air Navigation", Jul. 1, 2014, Retrieved from the Internet: URL: https://www.eurocontrol.int/sites/defa ult/files/content/documents/nm/safety/ACAS/training-acas-overview-july2014.pdf [retrieved on May 8, 2019].

Anonymous: "Flight management system—Wikipedia", Jul. 29, 2014 Retrieved from the Internet: URL: https://en.wikipedia.org/w/index.php?t itle=Flight management system&oldid=619008488 [retrieved on Jul. 13, 2017].

* cited by examiner

TCAS COUPLED FMS

TECHNICAL FIELD

The present invention generally relates to aircraft flight control systems, and more particularly relates to coupling a Traffic Alert and Collision Avoidance System (TCAS) to a flight management system (FMS) to determine responses to received TCAS alerts.

BACKGROUND

The Traffic Alert and Collision Avoidance System (TCAS) is a generally adopted standard for monitoring the space around a host aircraft and detecting neighbor traffic therein. A TCAS issues alerts when neighboring traffic infringe on dedicated buffer zones around the host aircraft. A Resolution Advisory (RA) is a TCAS alert that generally requires departing from an original flight plan to perform an evasive maneuver; RAs provide very little time to respond. Improved navigation system accuracy can increase the chance of neighbor aircraft being on or near the host aircraft's flight path, and together with increased airspace congestion, this increases the frequency of TCAS alerts and the importance of timely responses to TCAS alerts. Responding to TCAS alerts is an area of high cognitive demand, particularly in busy terminal areas. However, timely responses to TCAS alerts can also be an issue in the enroute environment, when pilots are less likely to expect a TCAS alert. Current methods for automated responses to TCAS alerts are often based on aircraft autopilot systems (AP), which can be expensive to retrofit into older aircraft. The AP implementations also require oversight and intervention from a pilot to distinguish accidental trips of a TCAS alert ("nuisance alerts").

Accordingly, improvements to aircraft flight control methods and systems are desirable. Specifically, technologically improved aircraft flight management systems and methods capable of longer range planning to avoid flight path conflicts and reduce the frequency of TCAS alerts requiring evasive maneuvers while reducing pilot response time and workload are desirable. The desired aircraft flight management systems and methods also determine when to automatically implement an evasive maneuver. The desired aircraft flight control systems and methods also automatically return the host aircraft to its original flight plan upon completion of execution of the evasive maneuver. Furthermore, other desirable features and characteristics of the present disclosure will become apparent from the subsequent Detailed Description and the appended claims, taken in conjunction with the accompanying drawings and this Background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A flight control method for an aircraft is provided, the method comprising: receiving aircraft state data from the navigation sensors; receiving a flight plan (FP) from a flight management system (FMS); receiving, from a Traffic Alert and Collision Avoidance System (TCAS), TCAS data; processing the aircraft state data and the TCAS data to identify a conflict between a trajectory of the aircraft and a neighbor aircraft; and selectively modifying one of the set including: the FP, a flight path, and a speed of the aircraft responsive to identifying the conflict between a trajectory of the aircraft and a neighbor aircraft.

Also provided is a flight management system for an aircraft, the system comprising: a navigation database; a flight plan database comprising a flight plan (FP); and a control module operationally coupled to the navigation database and the flight plan database, the control module configured to: receive aircraft state data from the navigation sensors; receive TCAS data from a Traffic Alert and Collision Avoidance System (TCAS); process the aircraft state data and the TCAS data to identify a conflict between a trajectory of the aircraft and a neighbor aircraft; and selectively modify one of the set including: the FP, a flight path, and a speed of the aircraft responsive to identifying the conflict between a trajectory of the aircraft and a neighbor aircraft.

Another flight management system for an aircraft is provided. The system comprising: navigation sensors providing aircraft state data; a navigation database; a flight plan database comprising a flight plan (FP); a Traffic Alert and Collision Avoidance System (TCAS); an autopilot system (AP); and a control module operationally coupled to the navigation sensors, the navigation database, the flight plan database, the TCAS, and the AP, the control module configured to: receive aircraft state data from the navigation sensors; receive TCAS data from a Traffic Alert and Collision Avoidance System (TCAS); process the aircraft state data, FP, and the TCAS data to identify a conflict between a trajectory of the aircraft and a neighbor aircraft; selectively modify one of the set including: the FP, a flight path, and a speed of the aircraft when there is a conflict between a trajectory of the aircraft and a neighbor aircraft; receive a TCAS Resolution Advisory (RA) commanding an evasive maneuver; responsive to receiving the TCAS RA, determine when (a) (i) vertical navigation (VNAV) is engaged, and (ii) an automatic pilot (AP) is engaged; upon determining that condition (a) has occurred, (i) process FMS data with the evasive maneuver determine whether a limiting condition applies; and (ii) implement the evasive maneuver upon determining that the evasive maneuver does not have a limiting condition.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may take the form of a control module (FIG. 1, 104), and may be separate from, or integrated within, a preexisting mobile platform management system, avionics system, or aircraft flight management system (FMS).

Exemplary embodiments of the disclosed enhanced flight control system 102, and control module (FIG. 1, 104) for enhanced flight control, deliver a technological improvement over a conventional flight management systems as follows. Effectively, the control module 104 couples the TCAS (FIG. 1, 136) to the FMS (FIG. 1, 132), allowing access to the navigation database (FIG. 1, 22) and the approach procedures and runway data therein. TCAS data comprises a neighbor aircraft's instantaneous position, bearing, range, and altitude. This technological improvement results in the ability to evaluate the TCAS data early enough to potentially modify the host aircraft's flight plan (FP) such that a subsequent related TCAS evasive maneuver is not issued/received. This technological improvement also enables, when a TCAS alert with an evasive maneuver is received, the ability to determine whether or not the evasive maneuver is automatically implemented. As used herein, "automatically implemented" means (i) without user input, and (ii) without delay. The novel rules associated with this technologic improvement are embodied in a program (FIG. 1, 162) in the control module 104. These features and additional functionality are described in more detail below.

Figure 1:
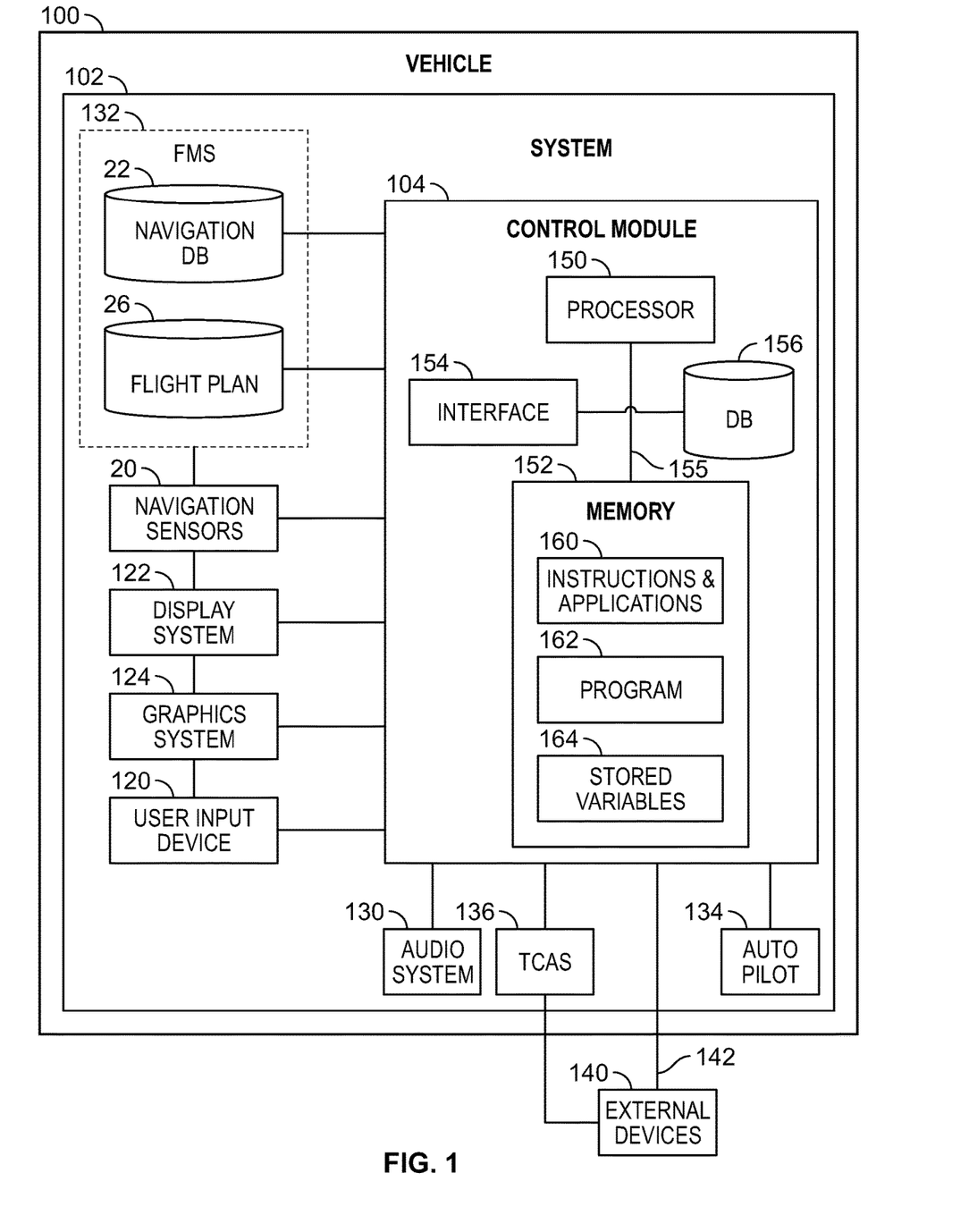
FIG. 1 is a block diagram of an enhanced flight control system, according to an exemplary embodiment.

Turning now to FIG. 1, a functional block diagram of a vehicle 100 including an enhanced flight control system 102 (also referred to herein as "system" 102) employing a novel control module 104 is depicted. In the embodiments described herein, the vehicle 100 is an aircraft, and may be referred to as aircraft 100. As an overview, the system 102 receives aircraft state data from the navigation sensors 20, receives a flight plan (FP) from a flight management system (FMS) 132, and receives TCAS data from a Traffic Alert and Collision Avoidance System (TCAS) 136. The system 102 processes the aircraft state data to identify therein an aircraft speed, and to identify or construct an aircraft trajectory (also referred to as an aircraft flight path). The system 102 processes those results with the TCAS data to identify a conflict between a trajectory of the aircraft and a neighbor aircraft, and selectively modifies one of the set including: the FP, a flight path, and a speed of the aircraft responsive to identifying the conflict between a trajectory of the aircraft and a neighbor aircraft. The operation of these functional blocks is described in more detail below resp.

In the system 102, the control module 104 is operationally coupled to the Flight Management System (FMS) 132, the navigation sensors 20, an autopilot system 134, and the Traffic Collision and Avoidance System (TCAS) 136. The control module 104 may also be coupled to a user input device 120, a display system 122, a graphics system 124, and an audio system 130.

Although shown externally for distinction and discussion, the depicted control module 104 may be integrated within the FMS 132, thereby realizing a technologically enhanced flight management system, within an aircraft 100; however, the concepts presented here can be deployed in a variety of mobile platforms, spacecraft, and the like. Accordingly, in various embodiments, the control module 104 may reside elsewhere and/or enhance part of larger aircraft traffic awareness system, avionics management system, or flight control system 102. Further, it will be appreciated that the flight control system 102 may differ from the embodiment depicted in FIG. 1. For example, aspects of the user input device 120, display system 122, and graphics system 124 may form a control display unit (CDU) used for command and control of the FMS 132.

In the illustrated embodiment, the control module 104 is configured to support communications via communications link 142, between external data source(s) 140 and the aircraft. External source(s) 140 may comprise air traffic control (ATC), neighboring aircraft, or other suitable command centers and ground locations. Communications link 142 may be wireless, utilizing one or more industry-standard wireless communication protocols. Non-limiting examples of data received from the external source(s) 140 includes, for example, instantaneous (i.e., real time or current) air traffic control (ATC) communications, traffic collision and avoidance system (TCAS) data from other aircraft, automatic dependent surveillance broadcast (ADS-B) data, and weather communications. In addition, an external data source 140 may be used to load or program a flight plan 26 into the system 102 (generally, into the FMS 132). In this regard, the control module 104 may command a radio communication system and/or another suitable data link system.

The navigation sensors 20 provide information for determining instantaneous current position for the aircraft 100. The instantaneous current position of a vehicle or aircraft 100 may be referred to as aircraft state data, and/or position determining data, and comprises the current latitude, longitude, heading, and the current altitude or above ground level for the aircraft. As used herein, "navigation data" may comprise data and information from the navigation sensors 20, such as, (host aircraft) position determining data, attitude and speed. The means for ascertaining current or instantaneous aircraft position determining data for the aircraft 100 may be realized, in various embodiments, as a global positioning system (GPS), inertial reference system (IRS), or a radio-based navigation system (e.g., VHF Omni-directional radio range (VOR) or long range aid to navigation (LORAN)), and may include one or more navigational radios or other sensors suitably configured to support operation of the Flight Management System (FMS) 132, as will be appreciated in the art.

The FMS 132 is a processing system that comprises a flight plan database 26 and a navigation database 22. The flight plan database 26 is a database that contains flight plans and flight plan information, for example, a series of waypoints and associated constraints such as altitudes, airspeeds etc. Before flight, usually during an initialization step (FIG. 2, 202), a flight plan (FP) is assigned for the host aircraft; it may be programmed or uploaded into the flight plan database 26. The navigation database 22 may comprise waypoint information, airport features information, runway position and location data, holding patterns, flight procedures, approach procedures, and various flight planning and distance measuring rules and parameters. The FMS 132 processes and integrates data from the flight plan database 26 and the navigation database 22 with navigation data received from the navigation sensors 20, and based thereon, determines an aircraft instantaneous position with respect to an assigned FP and guides the aircraft along the FP. The FMS 132 may also process the FP and position determining data to determine a current phase of flight. The FMS 132 additionally provides guidance (for example, on the display system 122), such as lateral navigation (LNAV), vertical navigation (VNAV) and speed control, to a crew. FMS data therefore, comprises any of: aircraft instantaneous position with respect to an assigned FP, a current phase of flight, and lateral navigation (LNAV) and vertical navigation (VNAV) status/information. As the FMS 132 inherently has a processor (not shown), and, in various embodiments, the control module 104 is integrated with the processor of the FMS 132, various processing activities attributed to the FMS 132 may be performed by the control module 104 and in particular, by the processor 150.

The Traffic Alert and Collision Avoidance System (TCAS) 136 may be a combination of hardware and software configured to monitor airspace around the aircraft 100 and communicate with neighbor traffic (external sources 140) found within the airspace around the aircraft 100 that are also equipped to support TCAS 136. TCAS 136 employs a TCAS communication protocol that is independent from ground based communication. TCAS 136 is generally configured to support the TCAS communication protocol by employing a dedicated transponder. TCAS data comprises a neighbor aircraft's instantaneous position, bearing, range, and altitude. TCAS 136 generally processes received TCAS data with current aircraft 100 state data and generates traffic advisory (TA) alerts and recommended evasive maneuvers (also referred to as resolution advisories, or RAs that command evasive maneuvers) responsive thereto.

The user input device 120 is coupled to the control module 104, and the user input device 120 and the control module 104 are cooperatively configured to allow a user (e.g., a pilot, co-pilot, or crew member) to interact with the display system 122, the FMS 132, and/or other elements of the system 102 in a conventional manner. The user input device 120 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. In embodiments using a touch sensitive screen, the user input device 120 may be integrated with a display device in display system 122. Non-limiting examples of uses for the user input device 120 include: entering values for stored variables 164, loading or updating instructions and applications 160, and loading and updating the contents of the database 156, such as the limiting conditions, each are described in more detail below. In addition, pilots or crew may enter flight plans, Standard Operating Procedures (SOP), and the like, via the user input device 120.

The audio system 130 may comprise any combination of speakers, bells, or alarms sufficient to generate sound in the form of speech and/or alarms that the crew can hear. The audio system 130 may receive commands from the control module 104 and convert the commands into emitted speech and sounds. Accordingly, the audio system 130 may comprise a means for converting the commands into the emitted sounds. The control module 104 is configured to generate commands that direct the audible alerts from the audio system 130.

The renderings of the display system 122 may be processed, at least in part, by the graphics system 124. In some embodiments, the graphics system 124 may be integrated within the control module 104; in other embodiments, the graphics system 124 may be integrated within the display system 122. Regardless of the state of integration of these subsystems, responsive to receiving display commands from the control module 104, the display system 122 displays, renders, or otherwise conveys one or more graphical representations or displayed images associated with operation of the aircraft 100, as described in greater detail below. In various embodiments, images displayed on the display system 122 may also be responsive to processed user input that was received via a user input device 120.

In general, the display system 122 may include any device or apparatus suitable for displaying flight information or other data associated with operation of the aircraft in a format viewable by a user. Display methods include various types of computer generated symbols, text, and graphic information representing, for example, pitch, heading, flight path, airspeed, altitude, runway information, waypoints, targets, obstacle, terrain, and required navigation performance (RNP) data in an integrated, multi-color or monochrome form. In practice, the display system 122 may be part of, or include, a primary flight display (PFD) system, a panel-mounted head down display (HDD), a head up display (HUD), or a head mounted display system, such as a "near to eye display" system. The display system 122 may comprise display devices that provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology.

The automatic pilot system 134 (also referred to as autopilot, or simply, AP) may be any combination of hardware and software. When engaged or activated, the autopilot system 134 processes current and instantaneous position and orientation information of the aircraft 100 and provides flight control guidance based thereon. In operation, flight control guidance may take the form of command and control of a flight control system (FCS, not shown) of the aircraft. In some embodiments, the autopilot system 134 also controls aircraft thrust. A pilot or crew may engage the autopilot via a user input device 120.

As mentioned, the control module 104 performs the functions of the system 102. As used herein, the flight plan (FP) is an initial plan for the aircraft's 100 travel, whereas the flight path is its trajectory at any given time. Having access to the FMS 132 and to the TCAS 136, the control module 104 is able to "look ahead" at the future flight path of the host aircraft 100 and make strategic determinations regarding received TCAS data. Strategic determinations include changing the FP, the flight path, or a speed of the aircraft to provide strategic collision avoidance. In an example, the control module 104 processes the TCAS data with the aircraft's FP, identifies a neighbor traffic that is in the way of a planned descent, and then modifies the FP by moving a planned top of descent. In another example, the control module 104 processes the WAS data with the aircraft's FP, identifies a neighbor traffic that is in the way of a planned descent, and then modifies the flight path by delaying a planned descent until the event that the neighbor traffic has cleared. In yet another example, the control module 104 processes the TCAS data with the aircraft's FP, identifies a neighbor traffic that is in the way of a flight path, and then modifies a speed of the aircraft 100 to avoid the neighbor traffic.

Figure 2:
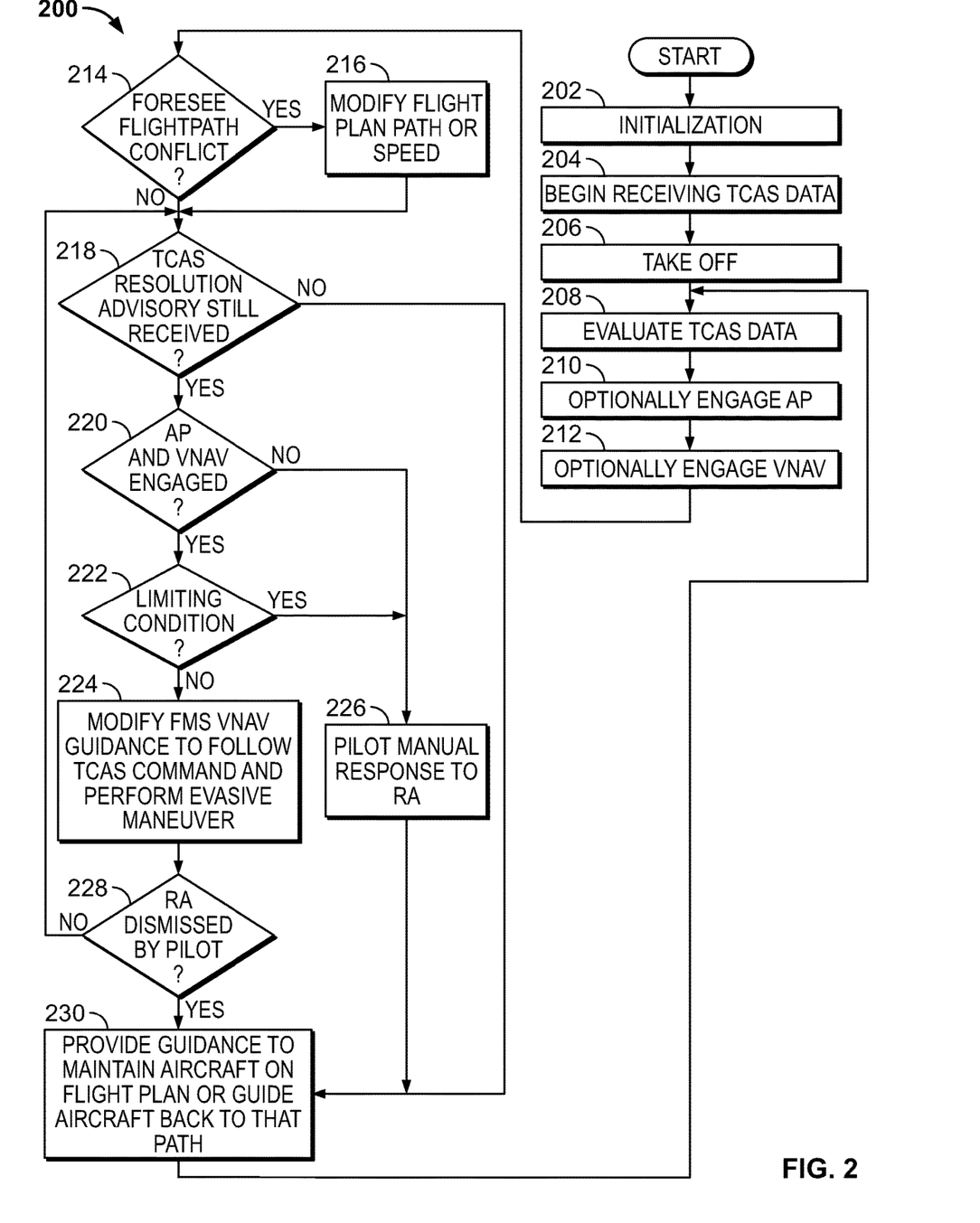
FIG. 2 is a flow chart for a method for enhanced flight control, according to an exemplary embodiment.

In addition to performing strategic functions, the control module 104 provides enhanced responses to received TCAS alerts, particularly, TCAS Resolutions Advisory (RA) evasive maneuvers, (shortened to "evasive maneuvers" herein) as follows. When an evasive maneuver is received (from TCAS 136), the control module evaluates whether auto pilot 134 and VNAV are engaged. As part of processing TCAS RA evasive maneuvers, the control module 104 may also determine whether a limiting condition exists for the evasive maneuver (FIG. 2, 222). The control module 104 implements the evasive maneuver automatically only upon determining that the evasive maneuver does not have a limiting condition (FIG. 224). A variety of limiting conditions may apply, non-limiting examples include: a nearby parallel runway, a terrain issue, a power issue, a weather issue, an altitude issue, an airspeed issue, the aircraft angle of attack (AOA) or a pilot entered inhibit.

For example, a TCAS RA may be received during a final approach to a runway due to traffic performing an approach to a parallel runway. Performing an evasive maneuver while close to the ground could in itself be a hazardous event. The control module 104 can use the FMS database to determine that there is a limiting condition associated with the closely spaced parallel runway and so rather than automatically respond to the RA, the control module could issue a pilot alert and/or seek pilot input (FIG. 2, 226). The alert may be audible, via the audio system 130.

In summary, responsive to receiving and processing TCAS data with FMS data (FMS data being data from the navigation database 22, data from the flight plan database 26, and VNAV engagement information) and navigation data, the control module 104 determines whether (i) the flight path shall be modified, (ii) the flight plan shall be modified, (iii) a speed shall be modified, (iv) an evasive maneuver shall be automatically implemented, or (v) control shall be returned to the pilot for manual operation in response to an evasive maneuver.

With continued reference to FIG. 1, within the control module 104, the processor 150 and the memory 152 (having therein the program 162) form a novel processing engine that performs the processing activities of the control module 104, in accordance with the program 162, as is described herein.

The control module 104 includes an interface 154, communicatively coupled to the processor 150 and memory 152 (via a bus 155), database 156. In various embodiments, the control module 104 performs actions and other functions in accordance with steps of a method 200 described in connection with FIG. 2. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 152, the navigation database 22 and the database 156 maintain data bits and may be utilized by the processor 150 as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164. In various embodiments, the limiting conditions (described in connection with FIG. 2, 216) may be stored in the database 156 or as part of the memory 152 within the control module. The database 156 is computer readable storage media in the form of any suitable type of storage apparatus, including direct access storage devices such as hard disk drives, flash systems, floppy disk drives and optical disk drives. The database 156 may include an airport database (comprising airport features) and a terrain database (comprising terrain features), parameters and instructions for runway detection and selection, and parameters and instructions for generating alerts as described herein. Information in the database 156 may be organized and/or imported from an external data source 140 during an initialization step of a process, it may also be programmed via a user input device 120 (see initialization 201 FIG. 2).

The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The interface 154 enables communications between the control module 104 and other system 102 components, external devices 140, and within the control module 104, can include one or more network interfaces to communicate with other systems or components. The interface 154 can be implemented using any suitable method and apparatus. For example, the interface 154 supports communication from a system driver and/or another computer system. In one embodiment, the interface 154 obtains data from external data source(s) 140 directly. The interface 154 may also include one or more network interfaces to communicate with technicians, and/or one or more storage interfaces for direct connection to storage apparatuses, such as the database 156.

During operation, the processor 150 loads and executes one or more programs, algorithms and rules embodied as instructions and applications 160 contained within the memory 152 and, as such, controls the general operation of the control module 104 as well as the system 102. In executing the process described herein, such as the method 200 of FIG. 2, the processor 150 specifically loads and executes the instructions embodied in the novel program 162. Additionally, the processor 150 is configured to, in accordance with the program 162: process received inputs (selectively, any combination of input from the set including: external data sources 140, the navigation sensors 20, autopilot system 134, TCAS 136, and the user input device 120); reference any of the databases (such as, the navigation database 22, and the database 156); generate display commands that command and control the display system 122; and, generate audio commands that command and control the audio system 130.

In a further exemplary embodiment, the control module 104 discussed above may be used to implement an enhanced flight control method 200, as shown in the flow chart of FIG. 2. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Moreover, one or more of the tasks shown in FIG. 2 could be omitted from an embodiment of the method 200 as long as the intended overall functionality remains intact.

The method starts, and at 202 the control module 104 is initialized. As mentioned above, initialization may comprise uploading or updating instructions and applications 160, program 162, stored variables 164, and the various lookup tables stored in the database 156. Examples of parameters that may be stored in stored variables 164 include parameters used by the instructions and applications 160 and the program 162, and the like. Stored variables 164 may also include various shapes, sizes, and color rendering references for flight images, buttons and displays such as employed on a graphical user interface (GUI) displayed on the display system 122. In some embodiments, the program 162 includes additional instructions and rules for commanding various audio system 130 devices such as speakers and alarms.

At 204, the aircraft begins receiving TCAS data. The TCAS data is received by the control module 104 for processing. The TCAS 136 is understood to be continually processing received neighbor traffic data to monitor a predetermined buffer zone around the host aircraft 100. At 206, the aircraft takes off, beginning a flight. At 208, the control module 104 begins evaluating neighbor aircraft trajectories, as compared to the trajectory of the host aircraft, based on the TCAS data. At 210, the autopilot system 134 is optionally engaged. An engaged autopilot system 134 means that it is activated, or turned on and operating, and the autopilot system 134 begins holding an aircraft attitude.

At 212, VNAV is optionally engaged or activated (i.e., it is turned on and operating). When VNAV is engaged, the FMS 132 has control over the vertical path of the aircraft 100. In some embodiments, at 212 the aircraft 100 is flying, following the flight plan 26, under control of VNAV and autopilot 134. As may be appreciated, the aircraft 100 may be following the flight plan 26 prior to engaging autopilot system 134 and/or prior to engaging VNAV, under command of the pilot. Throughout the performance of the method 200, aircraft state data, in particular, the position determining data, is continuously received. The method 200 also continuously processes the position determining data with the designated flight plan 26, to track the aircraft's 100 progress on the flight plan and to determine a respective phase of flight for the aircraft 100.

At 214, if a flight path conflict is predicted (i.e., a conflict between a planned flight path of the host aircraft 100 and a trajectory of a neighbor aircraft), the control module 104 proceeds to 216. At 216, any combination of: the flight plan, the flight path, or the speed, of the aircraft 100 may be selectively modified. In other embodiments, a prompt to the pilot seeks pilot approval before modifying the flight path at 216. It is to be understood that, due to access to the FMS data, the modified flight path at 216 is able to account for the aircraft FP intended path. As mentioned, without the present configuration with the control module 104, this data is not available to the TCAS 136; accordingly the control module 104 provides strategic insight, and may be able to avoid a situation where two aircraft trajectories are close enough that a TCAS resolution advisory (RA) is generated by the TCAS 136. Some flight plan, flight path, and speed modifications have been described above. Other phases of flight within a flight path may also be modified at 216, such as a missed approach, climbs, and a VNAV descent. From 216, the method 200 proceeds to the additional checks beginning at 218.

Performing the step at 216 may avert a subsequent RA that other TCAS response systems are not able to anticipate and avert. As noted in steps 210 and 212 respectively, the autopilot and VNAV functions are optionally engaged. The FP may be modified at 216 whether or not the AP and VNAV modes are engaged. If no flightpath conflict is predicted at 214, the method proceeds to the additional checks beginning at 218. At 218, if a TCAS resolution advisory (RA) is received (with or without having modified the FP at 216), the TCAS 136 has generated the RA based on received TCAS data, which comprises a neighbor aircraft's instantaneous position, bearing, range, and altitude. If a TCAS resolution advisory (RA) is received at 218, and the AP and VNAV are engaged at 220, the control module 104, begins following the evasive maneuver, and determines whether or not a limiting condition is present at 222. Examples of limiting conditions include: a nearby parallel runway, a terrain issue, a power issue, a weather issue, an altitude issue, an airspeed issue, the aircraft angle of attack or a pilot entered inhibit. To determine whether a limiting condition applies, method 200 references the FMS 132 (specifically, the navigation database 22 and the flight plan 26), and processes data therefrom with the current phase of flight, and the received evasive maneuver (RA). In some embodiments data from other interfaces such as from the autopilot 134 and from external devices 140, such as weather providers, may also be used to determine limiting conditions.

Responsive to any of the limiting conditions being present at 222, the control module 104 alerts the pilot or crew to potentially take control at 226 for a manual response to the RA. Also, if a TCAS resolution advisory (RA) is received at 218, and the AP and VNAV are not engaged at 220, the control module 104 alerts the pilot and returns the aircraft 100 to pilot manual response to the RA at 226.

If a TCAS resolution advisory (RA) is received at 218, the AP and VNAV are engaged at 220, and no limiting conditions are present at 222, then, at 224 the control module 104 modifies the FMS VNAV guidance to implement the evasive maneuver (RA). To do this, the control module 104 selects a VNAV submode that enables the control module 104 to command and change the vertical guidance such that the TCAS RA evasive maneuver is automatically executed. If no limiting condition applies to the evasive maneuver at 222, then the method 200 moves toward allowing an automatic implementation of the evasive maneuver at 224. At 224, with VNAV mode engaged, the control module 104 may generate commands to guide the aircraft in the vertical axis and execute the evasive maneuver according to resolution advisory commands from the TCAS 136. The control module 104 would typically provide these commands in the vertical axis by selecting one of a number of VNAV submodes including "Vertical Speed", "Flight Level Change" (VFLC), or "Vertical Path" (VPTH).

As mentioned, in some embodiments, there is an opportunity for a user to override or prohibit an automatic implementation of the evasive maneuver (at 222). A user override may be received at any point in the method 200, and may return the control of the aircraft 100 to the pilot at 226.

At 228 or 226 if the RA is dismissed or completed by the pilot, then at 230, the control module 104 provides guidance to (i) maintain the aircraft 100 on the flight path associated with the flight plan 26 or (ii) guide the aircraft 100 back to the flight path associated with the flight plan 26. The control module 104 may also return to 230 after 226 and after 218. From 230, the method may proceed back to 208 to continue executing method 200 throughout the remainder of the flight. At 228 if the RA is not dismissed by the pilot, the control module 104 returns to 218 to continue evaluating checks beginning at 218.

Once the automatic implementation of the evasive maneuver is completed at 224, the method 200 may automatically, and without user input, return the aircraft 100 to its flight plan 26 at 230.

Accordingly, the exemplary embodiments discussed above provide a technologically improved flight control system 102 that effectively couples an aircraft's TCAS 136 to its FMS 132. The technologically improved flight control system 102 capably evaluates approach procedure and runway geometries before automatically implementing the evasive maneuver; in doing so, a variety of limiting conditions can be identified. Limiting conditions on the evasive maneuver include, for example, a closely spaced parallel runway, and/or a location where there have been issues with previously performed evasive maneuvers.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight control method for collision avoidance for a host aircraft, the method comprising:
receiving host aircraft state data from navigation sensors;
receiving a flight plan (FP) for the host aircraft from a flight management system (FMS), the FP comprising a planned flight path;
receiving, from a Traffic Alert and Collision Avoidance System (TCAS), TCAS data;
receiving a TCAS resolution advisory (RA) related to a neighbor aircraft, the TCAS RA being an evasive maneuver;
responsive to receiving the RA, automatically beginning executing the evasive maneuver when both vertical navigation (VNAV) is engaged in the FMS and automatic pilot (AP) is engaged, and either (i) continuing executing the evasive maneuver by modifying FMS VNAV guidance, responsive to
referencing the FMS to determine that a limiting condition does not apply to the evasive maneuver;
(ii) alerting a pilot to take control for a manual execution of a remainder of the evasive maneuver, responsive to determining that the limiting condition applies to the evasive maneuver.

2. The method of claim 1, further comprising automatically and without user input, providing guidance for returning the host aircraft to the FP subsequent to implementing the evasive maneuver.

3. The method of claim 1, further comprising continuing executing the evasive maneuver upon further condition that no user override was received.

4. The method of claim 2, wherein providing guidance for returning to the FP responsive to completing the evasive maneuver is based on receiving a pilot concurrence.

5. The method of claim 1, wherein the evasive maneuver comprises a climb or descent modification to a planned descent of the planned flight path.

6. A flight management system for a host aircraft, the system comprising:
a flight management system (FMS) comprising a flight plan (FP) for the host aircraft, the FP comprising a planned flight path;
an autopilot system (AP); and
a control module operationally coupled to the FMS and to the AP, the control module configured to:
determine, in the host aircraft, each of the following conditions: (1) when AP is engaged, (2) that the flight plan (FP) is in the FMS, and (3) when vertical navigation (VNAV) is engaged in the FMS;
receive position determining data for the host aircraft from the FMS;
receive TCAS data from a Traffic Alert and Collision Avoidance System (TCAS);
receive a TCAS resolution advisory (RA) related to a neighbor aircraft, the TCAS RA being an evasive maneuver;
responsive to receiving the RA, the system automatically begins executing the evasive maneuver when both the AP and VNAV are engaged; and
either (i) continues executing the evasive maneuver by modifying FMS VNAV guidance, responsive to referencing the FMS to determine that a limiting condition does not apply to the evasive maneuver; or (ii) alerts a pilot to take control for a manual execution of a remainder of the evasive maneuver, responsive to determining that the limiting condition applies to the evasive maneuver.

7. The system of claim 6, wherein the control module is further configured to continue executing the evasive maneuver upon further condition that no user override was received.

8. The system of claim 6, wherein the control module is further configured to modify the planned flight path only when a pilot concurrence is received.

9. The system of claim 6, wherein the control module is further configured to:
select a VNAV submode that enables the control module to command and control the vertical path of the host aircraft; and
implement the evasive maneuver only responsive to selecting the VNAV submode.

10. The method of claim 1, further comprising, subsequent to receiving the TCAS RA, determining that the TCAS RA has been dismissed by a pilot and providing guidance to guide the host aircraft back to its FP.

11. The system of claim 7, wherein the control module is further configured to, subsequent to receiving the TCAS RA, determine that the TCAS RA has been dismissed by a pilot and provide guidance to guide the host aircraft back to its FP.

12. The system of claim 9, wherein the VNAV submode is one from the set including: "Vertical Speed," "Flight Level Change" (VFLC), and "Vertical Path" (VPTH).

\* \* \* \* \*